US005366854A

United States Patent [19]

Miyoshi et al.

[11] Patent Number: 5,366,854

[45] Date of Patent: Nov. 22, 1994

[54] PHOTOGRAPHIC PRINTING PAPER SUPPORT

[75] Inventors: Takahito Miyoshi; Yasuo Nishikawa; Takanori Sato; Sugihiko Tada, all of Onakazato Fujinomiya, Japan

[73] Assignee: Fuji Photo Film Co., Ltd., Kanagawa, Japan

[21] Appl. No.: 233,898

[22] Filed: Apr. 28, 1994

[30] Foreign Application Priority Data

Apr. 28, 1993 [JP] Japan .................................. 5-128019

[51] Int. Cl.[5] ........................ G03C 1/775; B32B 27/08

[52] U.S. Cl. .................................... 430/538; 430/538; 428/328; 428/330; 428/332; 428/412; 428/425.1; 428/513

[58] Field of Search ................ 430/537, 538; 428/330, 428/332, 412, 481, 425.1, 513, 328

[56] References Cited

U.S. PATENT DOCUMENTS

| | | | |
|---|---|---|---|
| 4,447,524 | 5/1984 | Uno et al. | 430/538 |
| 5,312,682 | 5/1994 | Nishikawa et al. | 430/538 |

*Primary Examiner*—Jack P. Brammer
*Attorney, Agent, or Firm*—Sughrue, Mion, Zinn, Macpeak & Seas

[57] ABSTRACT

Disclosed is a photographic printing paper comprising a raw paper which has on the emulsion side a resin coating constituted of polyethylene terephthalate or a resin blend of polyethylene terephthalate and another resin and titanium oxide grains dispersed therein and on the back side a resin coating constituted of the same polyethylene terephthalate or resin blend as used in the resin coating on the emulsion side and inorganic grains having an average grain size of from 1.5 to 12 μm.

11 Claims, No Drawings

PHOTOGRAPHIC PRINTING PAPER SUPPORT

FIELD OF THE INVENTION

The present invention relates to a photographic printing paper support and, more particularly, to a photographic printing paper support which enables long-term retention of adhesion between a raw paper and coatings laminated thereon.

BACKGROUND OF THE INVENTION

For the purpose of improving light-reflecting efficiency of photographic printing paper as well as water-resisting property thereof, a resinous coating containing titanium oxide kneaded with and thereby dispersed in a polyolefin, such as polyethylene or the like, has so far been provided on the front side of a raw paper (to which emulsions are to be applied). While the titanium oxide therein can enhance the image quality, particularly through its heightening the whiteness of photographic printing paper, it adversely affect the surface smoothness of printing paper.

Such polyolefins as described above have been widely used as resins having excellent workability because of their high flexibility.

However, polyelefin resins, though excellent in flexibility, are low in stiffness. That is, they are inferior in self-supportability and lacks in a rigid feeling.

Thus, there have been proposed the photographic printing paper supports having polyethylene terephthalate coatings on both sides thereof [JP-A-56-870388 (the term "JP-A" as used herein means an "unexamined published Japanese patent application"), JP-A-60-238828, JP-A-62-31244 and JP-A-62-44734]. These supports however have a defect such that only the coating provided on the back side of a raw paper deteriorates its adhesiveness to the raw paper with the lapse of time, and a reason why this phenomenon occurs is not yet explained.

As a result of our intensive study for obviating the above-described defect, it has been found out that the adhesion between a raw paper and a coating provided on the back side thereof did not change with lapse of time when the coating was constituted of polyethylene terephthalate or a resin blend of polyethyleneterephthalate and another resin (which is abbreviated as "a resin blend" hereinafter) and inorganic grains having their sizes in a specified range, thereby achieving the present invention.

SUMMARY OF THE INVENTION

Therefore, an object of the present invention is to provide a photographic printing paper support which ensures excellent adhesion between a raw paper and a coating provided on the back side thereof through preventing the adhesion from deteriorating with the lapse of time.

The above-described object is attained with a photographic printing paper support comprising a raw paper provided with resin coatings on both sides, said resin coating on the emulsion side (or the side to which emulsions are to be applied) being constituted of polyethylene terephthalate or a resin blend of polyethylene terephthalate and a resin other than polyethylene terephthalate and titanium oxide incorporated and dispersed therein, and said resin coating on the back side of the raw paper being constituted of a resin component consisting of the same polyethylene terephthalate or resin blend as used in the resin coating on the emulsion side and inorganic grains having a number average grain size of from 1.5 $\mu m$ to 12 $\mu m$ which are incorporated in said resin component.

DETAILED DESCRIPTION OF THE INVENTION

The term "polyethylene terephthalate" as used herein is intended to include not only polyethylene terephthalate as homopolymer but also copolymers obtained by copolymerization of the ordinal monomers, namely terephthalic acid and ethylene glycol, with no more than 50 wt. % of other monomers (e.g., dibasic acids such as isophthalic acid, 5-sodiumsulfoisophthalic acid and 2,6-dinaphthalenedicarboxylic acid, and diols such as 2,2-bis(4-hydroxyethoxyphenyl)propane, cyclohexanedimethanol, diethylene glycol and triethylene glycol). It is desirable that the polymerization degree of polyethylene terephthalate be within such a range as to show intrinsic viscosity of from 0.40 to 0.80 (at 25° C.).

The resin, other than polyethylene terephthalate, used as a blend with polyethylene terephthalate (which is called a blending resin hereinafter) can be properly chosen from resins capable of being hot-extruded at a temperature of 270°–350° C., with specific examples including polyolefin resins such as polyethylene, polypropylene or the like, polyether resins such as polyethylene glycol, polyoxymethylene, polyoxypropylene and the like, urethane resins such as polyurethanes of polyester type, polyether polyurethane and the like, polycarbonates and polystyrenes.

The above-cited blending resins can be used alone or as a mixture of two or more thereof.

In blending polyethylene terephthalate and a blending resin, the ratio between them can be properly chosen depending on the polymerization degree and the kind of the blending resin used. When a polyolefin resin is used as blending resin, it is desirable that the polyethylene terephthalate and the blending resin be blended in a ratio of from 99:1 to 80:20 by weight. The polyolefin resin blended in a proportion exceeding over the upper limit described above causes marked deterioration in physical properties of the resulting blend. As a result of it, the photographic printing paper support provided with coatings of such a resin blend is poor in stiffness, so that it cannot have sufficient surface smoothness.

When resins other than polyolefin resins are used as blending resin, on the other hand, it is desirable that the blending ratio between the polyethylene terephthalate and the blending resin be in the range of 99:1 to 40:60 by weight. The resin blend containing the blending resin in a proportion greater than 60 wt. % cannot satisfactorily prevent the resulting photographic printing paper support from curling upon storage. In addition, when the proportion of polyethylene terephthalate is decreased below 40 wt. %, most of the resin blends suffer deterioration in physical properties, so that they cannot have high adhesiveness to a raw paper to constitute a photographic printing paper support.

The titanium oxide used in the present invention may have either crystal form of anatase type or that of rutile type. As for the grain size thereof, however, it is desirable that the titanium oxide have an average grain size ranging from 0.1 $\mu m$ to 0.8 $\mu m$. When the average grain size is smaller than 0.1 $\mu m$, it is difficult to homogeneously incorporate and disperse the titanium oxide in the resin layer, whereas when the average grain size is greater than 0.8 μm the titanium oxide cannot impart satisfactory whiteness and, what is worse, affects adversely the image quality since it forms projections on the coating surface.

As for the titanium oxide having such a crystal form and an average grain size as described above, KA-10 and KA-20, trade names, products of Titan Kogyo Co., Ltd., are examples thereof.

The content of titanium oxide in the resin coating on the emulsion side is preferably in the range of 2 to 20 wt. %.

The inorganic grains used in the present invention, which are incorporated and dispersed in the resin coating on the back side of a raw paper, desirably have an average grain size greater than 1.5 μm, and that no greater than 12 μm. The average grain size thereof is preferably in the range of 2.0 to 10 μm. When the average grain size of the inorganic grains is less than 1.5 μm, the behavior of the extruded melt film upon hot-extrusion coating becomes unstable, and thereby are caused undesirable phenomena including surging and neck-in phenomena. Conversely, when the inorganic grains have an average grain size greater than 12 μm, the adhesiveness of the resulting resin coating to the raw paper deteriorates with the lapse of time.

These inorganic grains are desirably added in a proportion of 1 to 40 parts by weight to 100 parts by weight of polyethylene terephthalate or the resin blend. When the inorganic grains are added in a proportion less than 1 part by weight, they cannot reinforce the adhesiveness of the resin coating to a raw paper; whereas when the inorganic grains are added in a proportion greater than 40 parts by weight the dust of the inorganic grains falls off the resulting resin coating by its surface's being scraped off by rubbing.

Moreover, it is desirable that the inorganic grains have Mohs' hardness of 4 or less. When the inorganic grains have Mohs' hardness greater than 4, they are responsible for abrasion of rollers or the like installed in a developing machine (as laboratory equipment).

Specific examples of inorganic grains having the above-described average grain size include talc, kaolin, $CaCO_3$, $BaSO_4$ and $CaSO_4$.

Incorporation of the titanium oxide or the inorganic grains in the foregoing polyethylene terephthalate or resin blend can be carried out with ease in a conventional manner.

In preparing the photographic printing paper support of the present invention, a composition obtained by mixing polyethylene terephthalate or a resin blend of polyethylene terephthalate and a blending resin with titanium oxide is applied to one side of a raw paper to form a coating on which emulsions are to be coated, and further to the other side of the raw paper is applied a composition obtained by mixing polyethylene terephthalate or a resin blend of polyethylene terephthalate and a blending resin with the inorganic grains having a specified average grain size.

It is desirable that each of the resin coatings on a raw paper have a thickness of from 5 to 50 μm, particularly from 10 to 30 μm. This is because when the thickness is thicker than 50 μm the coating tends to crack, whereas when it is thinner than 5 μm the resulting photographic printing paper support is insufficient in water resistance and poor in stiffness.

In prior to the application of the above-described compositions to a raw paper, the raw paper surface may undergo a pretreatment such as a corona discharge treatment or the formation of a undercoating.

The titanium oxide-containing composition coating on the thus formed support is, as well known, coated with photographic emulsion layers, thereby obtaining photographic printing paper having not only excellent water resistance, whiteness and gloss but also high adhesiveness of the coatings to a raw paper.

In accordance with embodiments of the present invention, the support comprises a raw paper each surface of which is coated with a resin composition containing as a main component polyethylene terephthalate inherently superior in surface smoothness to polyolefins, and using this support makes it feasible not only to impart satisfactory stiffness and tearing strength to photographic printing paper as the water resistance and the whiteness of the resulting photographic printing paper are on the same level as usual, but also to prevent the adhesiveness of the coatings to the raw paper from deteriorating with the lapse of time.

The present invention will now be illustrated in more detail by reference to the following examples. However, the invention should not be construed as being limited to these examples.

EXAMPLES 1 to 3 AND COMPARATIVE EXAMPLES 1 to 4

A polyethylene terephthalate resin ( PET ) composition containing 10 wt. % of titanium oxide was hot-extruded at 300° C. on the surface of a 170 μm-thick raw paper to form a coating having a thickness of 30 μm, and on the back side of the raw paper was hot-extruded at 300° C. a PET composition containing an inorganic powder chosen from those set forth in Table 1 to form a coating having a thickness of 30 μm. The thus obtained photographic printing paper supports were used as samples, and examined for deterioration of adhesiveness of the coating on the back side (back coating) to the raw paper with the lapse of time. The results obtained are shown in Table 1.

TABLE 1

| | ex. 1 | ex. 2 | ex. 3 | Comp. ex. 1 | Comp. ex. 2 | Comp. ex. 3 | Comp. ex. 4 |
|---|---|---|---|---|---|---|---|
| Species of powder in back coating | talc | $CaCO_3$ | $BaSO_4$ | $CaCO_3$ | $CaCO_3$ | $CaWO_4$ | no additive |
| Grain size (μm) of powder in back coating | 3.0 | 3.0 | 3.0 | 0.5 | 15.0 | 3.0 | — |
| Content (parts by weight) of powder in back coating | 20 | 20 | 20 | 20 | 20 | 20 | — |
| Mohs' Hardness of powder in back coating | 1 | 3 | 3.5 | 3 | 3 | 4.5 | — |
| Peeling strength of back coating just after formation | 3.6 N | 3.7 N | 3.3 N | 3.6 N | 2.9 N | 2.9 N | 2.5 N |
| Peeling strength of back coating after 10-day lapse* from coating formation | 3.3 N | 3.3 N | 3.2 N | 3.0 N | 1.3 N | 1.6 N | 0.9 N |
| Width of extruded melt filem (1 cm beneath T-die slit) | 14 cm | 14 cm | 14 cm | 10 cm | 14 cm | 12 cm | 14.5 cm |

The mark "*" in the table means that each sample having a width of 1.5 cm was allowed to stand for 10 days in a room the temperature and the relative humidity of which were regulated at 20° C. and 70% respectively, and then examined for peeling strength.

The mark "*" in the table means that each sample having a width of 1.5 cm was allowed to stand for 10 days in a room the temperature and the relative humidity of which were regulated at 20° C. and 70% respectively, and then examined for peeling strength.

The adhesiveness of the back coating to the raw paper was evaluated by the peeling strength of a 1.5 cm-wide sample at a peeling angle of 180°.

The physical property of each melt film extruded from a T-die was evaluated by carrying out visual observation of the extruded melt film width at the position of 1 cm right beneath the T-die slit under a condition that each PET composition was hot-extruded at a speed of 80 g/min from the T-die slit measuring 15 cm in width and 0.5 m in gap.

In case of the samples, excluding the sample of Comparative Example 3, the rubber rollers of an automatic developing machine installed in a small-scale laboratory were hardly abraded even by passing 1,000,000 sheets of service-sized photographic printing paper through the developing machine, and no travelling trouble did not occur throughout the continuous developing operation. In case of the sample of Comparative Example 3, on the other hand, the abrasion of the rubber rollers was serious and the developing operation in a small-scale laboratory suffered from travelling trouble. Thus, it was impossible to perform the photographic processing of 1,000,000 sheets of photographic printing paper.

What is claimed is:

1. A photographic printing paper support comprising a raw paper provided with resin coatings on both sides, said resin coating on the emulsion side (or the side where emulsions are to be coated) comprising a resin component consisting of polyethylene terephthalate or a resin blend of polyethylene terephthalate and a resin other than polyethylene terephthalate and titanium oxide incorporated and dispersed in the resin component, and said resin coating on the back side of the raw paper comprising the same resin component as used in the resin coating on the emulsion side and inorganic grains which have a number average grain size of from 1.5 μm to 12 μm and are incorporated in the resin component.

2. The photographic printing paper of claim 1, wherein the content of the inorganic grains in the resin coating on the back side is in the range of 1 to 40 parts by weight per 100 parts by weight of the polyethylene terephthalate or the resin blend.

3. The photographic printing paper of claim 1, wherein the inorganic grains in the resin coating on the back side have Mohs' hardness of not greater than 4.

4. The photographic printing paper of claim 1, wherein the inorganic grains in the resin coating on the back side are the grains of talc, kaolin, $CaCO_3$, $BaSO_4$ and $CaSO_4$.

5. The photographic printing paper of claim 1, wherein the resin blended with polyethylene terephthalate is a polyolefin resin.

6. The photographic printing paper of claim 1, wherein the resin blended with polyethylene terephthalate is a polyether resin, a urethane resin, a polycarbonate resin, a polystyrene resin or a mixture of two or more thereof.

7. The photographic printing paper of claim 5, wherein the blending ratio of the polyethylene terephthalate to the polyolefin resin is in the range of 99:1 to 80:20.

8. The photographic printing paper of claim 6, wherein the blending ratio of the polyethylene terephthalate to the resin blended therewith is in the range of 99:1 to 40:60.

9. The photographic printing paper of claim 1, wherein the titanium oxide in the resin coating on the emulsion side has a grain size of from 0.1 to 0.8 μm.

10. The photographic printing paper of claim 9, wherein the content of titanium oxide in the resin coating on the emulsion side ranges from 2 to 20 % by weight.

11. The photographic printing paper of claim 1, wherein the resin coatings each have a thickness of from 5 to 50 μm.

* * * * *